Dec. 4, 1962  A. MAURER  3,066,778
ONE-WAY CLUTCHES
Filed Aug. 6, 1959

INVENTOR.
Albrecht Maurer
BY
Michael S. Striker
Attorney

United States Patent Office 3,066,778
Patented Dec. 4, 1962

3,066,778
ONE-WAY CLUTCHES
Albrecht Maurer, Bad Homburg vor der Hohe, Germany, assignor to Ringspann Albrecht Maurer KG, Bad Homburg vor der Hohe, Germany
Filed Aug. 6, 1959, Ser. No. 832,003
Claims priority, application Germany Aug. 6, 1958
6 Claims. (Cl. 192—45.1)

The present invention relates to one-way clutches of the sprag type. More particularly, the invention relates to an overrunning or one-way clutch of the kind having a pair of cylindrical races defining therebetween an annular space for a set of tiltable grippers or sprags and for annular spring means whose purpose is to permanently bias the sprags toward engagement with the races, the purpose of the sprags being to connect the races during relative rotation thereof in one direction but to permit relative rotation of the races in the opposite or freewheel direction.

It is a known disadvantage of presently utilized sprag-type freewheel or one-way clutches that, as a result of the slippage of the sprags in relation to the locking surfaces which surround the annular sprag-receiving space between the inner and the outer races, and more particularly as a result of the slippage of the sprags in relation to the locking surface of the inner race, substantially plane or flat worn areas or zones are formed on the originally domed or convex contact surfaces of the sprags. Such worn areas impair, or may even render impossible, the locking action of the clutch, particularly on prolonged freewheeling at high overrunning speeds and with defective lubrication.

An object of the present invention is to overcome the disadvantages of presently utilized one-way clutches of the sprag-type in a very simple and efficient way.

Another object of the invention is to provide a one-way clutch of the sprag type which is capable of extensive use and whose component parts are so constructed and assembled that the wear and tear upon the sprags is distributed over the entire contact surfaces thereof.

A further object of the instant invention is to provide a clutch assembly of the above outlined characteristics which is equally useful at comparatively high and at very low overrunning speeds.

A still further object of the invention is to provide a one-way or freewheel clutch assembly of the type as above set forth which is so constructed that the reliability of the drive is maintained even after extensive wear upon the sprags.

A yet further object of the invention is to provide an overrunning clutch of the sprag type which is so constructed that the wearing process is extended over the whole of the contact areas on the sprags which are concerned in an effective drive.

With the above objects in view, the invention resides essentially in the provision of a one-way clutch assembly which comprises an annular inner race, an annular outer race which surrounds the inner race and defines with the latter an annular space of continuously varying radial width for reception of a set of closely adjacent tiltable gripping members or sprags which are constantly biased by an annular spring into engagement with the adjacent surfaces of the races. The races are rotatable relative to one another about a common axis which preferably constitutes the axis of symmetry of the one or both races. The annular space of continuously varying radial width may be formed in a number of ways, for example, by mounting the inner or the outer race in such a manner that its axis of symmetry is eccentric with respect to the axis about which the races rotate. Alternately, the inner surface of the outer race and/or the outer surface of the inner race may be formed as an out-of-round surface, e.g. of elliptical cross-sectional contour.

By forming the annular space in the above described manner, the sprags, which normally rotate with the outer race of the one-way clutch assembly, are caused to perform a combined creeping and reciprocating tilting movement whereby they pass consecutively through zones or areas of different radial width in the aforementioned annular space. Owing to such reciprocating tilting movement which is due to the continuously varying radial width of the annular space, the sprags are caused to bring all or nearly all zones of their domed or convex contact surfaces into engagement with the inner and outer races and, consequently, the contact surfaces are worn or rubbed away to the same extent. Thus, the formation of flat zones or areas on the contact surfaces of the sprags is effectively prevented which contributes to longer useful life of the clutch assembly.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawing, in which:

Figure 1:
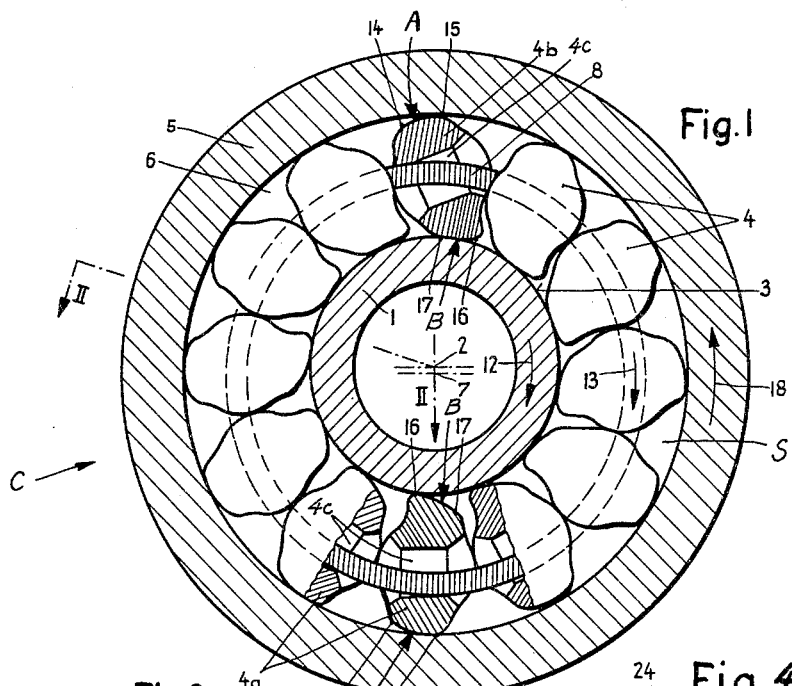
FIG. 1 is a sectional view through one form of the clutch embodying my invention, the section being taken on the line I—I of FIG. 2, as seen in the direction of arrows, and certain sprags being broken away.

Referring now in greater detail to the illustrated embodiments, and first to that shown in FIG. 1, the one-way clutch C comprises an inner clutch member or race 1 which is mounted for rotation about an axis 2 and is formed with a locking outer surface 3 which is of true or circular cylindrical contour, the axis of this surface coinciding with the axis 2 about which the race 1 rotates. The clutch C further comprises an outer clutch member or race 5 which, too, is mounted for rotation about the axis 2. The locking inner surface 6 of the outer race 5 is a true cylindrical surface of circular cross-sectional contour; however, the axis 7 of this surface is eccentric with respect to the aforementioned axis 2. As a result of such eccentric arrangement of the axes of locking surfaces 3 and 6, the annular space S defined thereby is of non-uniform radial width, i.e. the distance in the radial direction of races 1, 5 between their respective locking surfaces 3, 6 varies continuously between a maximum distance corresponding to the difference between the radii of surfaces 3, 6 plus the shortest distance between the axes 2, 7, and a minimum distance corresponding to the difference between the radii of surfaces 3, 6 minus the shortest distance between the axes 2, 7. Preferably, the difference between the maximum and minimum radial widths of the annular space S corresponds at most to the radial increase in the height of sprags 4 on tilting out of the extreme freewheel position into the extreme locking position.

The configuration of the set of tiltable gripping member or sprags 4 which are housed in the annular space S is such as to connect the inner and outer races 1, 5 during relative rotation thereof in one direction but to permit relative rotation of the races in the opposite direction. The sprag 4a is shown in section and is located in the space S at a point of maximum radial distance between the locking surfaces 3 and 6. The sprag 4b, on the other hand, occupies that zone of the space S where the radial distance between the locking surfaces 3, 6 reaches its minimum value. It will be readily noted that the inclination of gripping member or sprag 4a is smaller than the inclination of sprag 4b. Each sprag 4 is formed with a channel or passage 4c for a compressed annular spring 8 whose function is to exert a constant tilting moment in clockwise direction upon the sprags 4 whereby each of these members is constantly biased into engagement with the locking surfaces of both races of the clutch assembly C. Due to the tendency of biasing means or spring 8 to expand, the sprag 4a is more upright in the space S than the member 4b which latter is located diametrically opposite thereto.

Figures 2, 4:
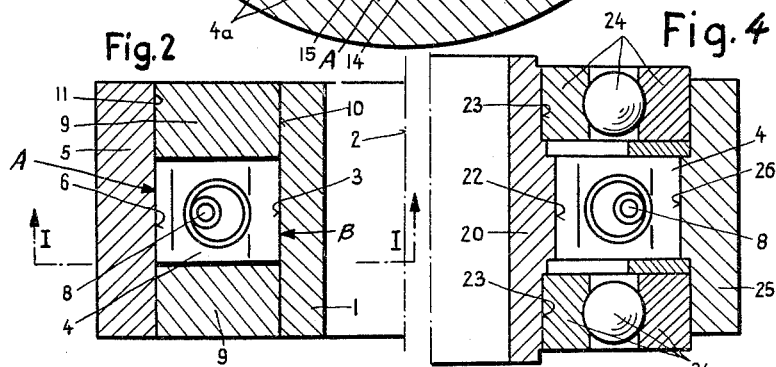
FIG. 2 is a fragmentary section taken along the line II—II and at right angles to the section of FIG. 1, as seen in the direction of arrows.
FIG. 4 is a greatly enlarged section taken on the line IV—IV of FIG. 3, as seen in the direction of arrows.

FIG. 2 illustrates the means for mounting the inner race 1 in relation to the outer race 5, this means comprising a pair of guide rings 9 which simultaneously serve as bearing bushes for the inner race 1. The inner surfaces 10 of rings 9 are coaxial with the locking surface 3; thus, the rings 9 constitute plain friction bearings for the inner race 1. The circumferential outer surfaces 11 of rings or bushes 9 are eccentric with respect to the axis 2 and to the outer locking surface 3, and are pressed against the adjacent zones of the internal locking surface 6 on the outer race 5. Rings 9 rotate with the outer race and, since the axes of their inner surfaces 10 coincide with the axis of rotation 2, the latter also constitutes the axis about which the outer race 5 rotates. In other words, while the axis 7 of the outer race 5 does not coincide with the axis 2, the outer race nevertheless rotates about the last mentioned axis.

Experience has shown that the set of sprags 4 rotates with the outer race 5 of the clutch assembly C, but creeps slowly along the locking surface 6 of member 5, travelling in the same or in the opposite direction according to whether the inner or the outer race is running at the higher speed.

If the outer race 5 of the overrunning or one-way clutch C is held against rotation, or when the movement of race 5 is arrested, for example, when the clutch C is utilized as a brake, and the innerrace is set in rotary motion or continues to rotate in the direction of arrow 12 which indicates the freewheel direction, the sprags 4 will perform a slow creeping movement in the direction of arrow 13. As a result of such creeping movement, the sprags will travel slowly through the annular space S of variable radial width and will simultaneously execute a slow tilting movement backwardly and forwardly between the one extreme position assumed in FIG. 1 by the sprag 4a, and the other extreme position assumed in FIG. 1 by the sprag 4b. Consequently, the line of contact between the outer race 5 and any one of sprags 4 will travel slowly in backward and forward directions between the points 14 and 15 while the contact line between the inner race 1 and each sprag 4 will travel from the point 16 to the point 17 and back upon each revolution of the sprags.

As a result of such continual displacement or travel of the contact lines between the sprags 4 and the races 1, 5, the wear upon the contact areas involved is uniformly distributed between the points 14, 15 and 16, 17 of the members 4. Such contact surfaces, i.e. the surfaces A, B between the points 14, 15 and 16, 17, respectively, on each sprag 4 will retain the even curvature which is indispensable for proper operation of the one-way clutch C, whereby the formation of plane or flat contact surfaces due to excessive wear upon certain isolated areas of the sprags is prevented at all times. As a result of the uniform distribution of wear over the whole of the contact areas A, B on each sprag 4, the freewheel or one-way clutch C of my invention will remain efficient as an effective drive for a much longer period than has been possible with similar clutches of known and presently utilized construction.

The same effect will also be obtained if the inner race 1 of the one-way clutch C is held against rotation and the outer race 5 is rotated in the freewheel direction indicated by the arrow 18. In this case, the entire set of sprags 4 will rotate with the outer race 5 but will gradually lag somewhat behind as a result of the creeping movement in the direction of the arrow 13. Since the locking surface 3 of the inner race 1 is truly cylindrical, i.e. of circular cross-sectional contour, and is coaxial with the axis 2 about which both races rotate, the widest zone of the annular space S (occupied in FIG. 1 by the sprag 4a) will rotate with the outer race 5. Thus, were it not for the aforementioned slow creeping movement in the direction indicated by the arrow 13, the sprags 4a, 4b and also all other members 4 would retain their positions of inclination with respect to the faces 1 and 5. However, due to such creeping movement, the sprags 4 travel successively through the annular space S and execute a slow reciprocating tilting movement such as has been described hereinbefore.

As is known, the wearing process upon the sprags 4 normally has the effect only at the two contact lines between the domed or convex outer surfaces A, B and the locking surfaces 6, 3 of the outer and inner races 5, 1, respectively. The outer contact surface A of each sprag 4 extends between the points 14, 15 and the inner contact surface B between the points 16, 17. Owing to the aforementioned reciprocating tilting movement performed by the sprags 4 when the one and/or the other race rotates in the free-wheel direction, the curvature of contact surfaces A, B remains unchanged and no flat or plane areas can be formed thereon. Thus, the wearing process is extended over the whole of the contact surfaces A, B on the sprags 4, and the even curvature of these contact surfaces is maintained even after extensive use of the clutch C and upon substantial wear of its sprags.

It will be readily understood that the same conditions will occur if both the inner and the outer races rotate in the same direction as long as the angular speed of the one race exceeds the angular speed o fthe outlet race, i.e., as long as one of the races overruns.

Figures 3, 5, 6:
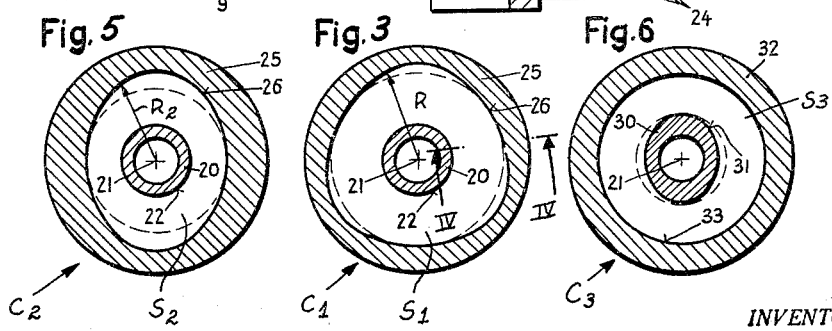
FIG. 3 is a smaller-scale sectional view similar to that of FIG. 1, showing a modified clutch assembly constructed in accordance with my invention, with the sprags and the annular spring omitted for the sake of clarity.
FIG. 5 is a sectional view, similar to that of FIG. 3, showing a third modification of the one-way clutch.
FIG. 6 illustrates a fourth modification of the clutch in a view similar to that of FIGS. 3 and 5.

An annular space of varying radial width for housing the sprags 4 may be formed in many other ways. For example, and as shown in FIGS. 3 and 4, the inner clutch member or race 20 is formed with a locking outer surface 22 which is a true cylindrical surface of circular cross-sectional contour, its axis coinciding with the axis 21 about which the modified sprag type one-way clutch $C_1$ rotates. The locking surface 22 occupies the medium zone of the periphery on the race 20 and is bounded by a pair of bearing surfaces or seatings 23 (see FIG. 4) also arranged concentrically with the axis 21. The bearing surfaces 23 are in contact with the inner races of two antifriction ball bearings 24 disposed at the opposing sides of the sprags 4. The latter have been omitted in FIG. 3 for the sake of clarity. Ball bearings 24 mount the outer race 25 of the clutch $C_1$ for rotation about the axis 21. The locking inner surface 26 of the outer clutch member or race 25 is formed as an out-of-round cylindrical surface, as is best shown in FIG. 3. The radius $R_1$ of the surface 26 varies continuously from a minimum value to a maximum value and back, three times in the course of a complete revolution. Thus, the radial width of annual space $S_1$ varies thrice between a maximum and a minimum value whereby the combined creeping and reciprocating tilting movement of sprags 4 is insured whenever the one or the other of races 20, 25 rotates, or when one of these races rotates at an angular speed higher than that of the other race, it being assumed that the rotation is in the freewheel direction.

FIG. 5 illustrates diagrammatically a further possibility of constructing the annular sprag-housing space with a periodically varying radial width. Here again, the locking outer surface 22 of the inner clutch member or race 20 is constructed in the form of a true cylindrical surface with a circular cross-sectional contour whose axis of symmetry coincides with the axis 21 about which the parts of the modified one-way clutch $C_2$ rotate. The locking inner surface 126 of the outer clutch member or race 125 is constructed in the form of an out-of-round cylindrical surface whose axis of symmetry coincides with the axis 21. The radius $R_2$ of the surface 126 executes two variations in the course of one full revolution, i.e., it can be said that the locking surface 126 is of oval or elliptical cross-sectional contour. It will be readily understood that, while FIGS. 3 and 5 show locking surfaces 26, 126, respectively, whose radii $R_1$, $R_2$ execute three of two variations in the course of a full revolution, such locking surfaces may be formed in a way that their radii execute four, five or even more variations during a complete revolution. The production of such out-of-round cylindrical locking surfaces can be carried out in a rather simple and convenient manner on the so-called polygon grinding machines which have been known for a long time. The annular space $S_2$ accommodates a set of sprags similar to those illustrated in FIGS. 1, 2 and 4, but not shown in FIG. 5. Such sprags may be mounted between a pair of antifriction bearings, for example, such as the assemblies 24 shown in FIG. 4.

The so far described specific embodiments of my invention are particularly useful in one-way clutches in which high overrunning speeds occur. Thus, whenever the one race rotates at a considerably higher speed than the other race, it is advantageous to construct the locking outer surface of the inner race as a circular cylindrical surface whose axis coincides with the common axis of rotation of both races, while the locking inner surface of the outer race is either constructed as a true circular cylindrical surface arranged eccentrically in relation to the axis of rotation, or as an out-of-round cylindrical surface with a radius which varies continuously and which is concentric with the circular cylindrical locking surface of the inner race. It will thus be seen that the construction shown in FIGS. 1 to 5 is best suited for use in clutches wherein high overrunning speeds occur, i.e., in which the one or the other of the races rotates at a higher speed relative to the rotational speed of the other race.

When the inner race is constructed in the form of a true or circular cylinder whose axis coincides with the axis of rotation (FIGS. 1 to 5), and the variable radial width of the annular sprag-housing space is produced by the eccentric position (space S) or the out-of-round shape (spaces $S_1$ and $S_2$) of the locking surface on the outer race, then the sprags are in a sharply tilted position at a point where the annular space is narrowest in width, while they are in the least tilted position at a point where the annular space is at its maximum width. If the creeping movement of the set of sprags 4 is ignored for the time being, then this position of the individual sprags is maintained when the outer race rotates relative to the inner race. In this case, the annular space S, $S_1$ or $S_2$ of variable width participates in the rotation because the outer race has a common axis of rotation with the inner race and, in addition, the inner race is formed with a true or circular cylindrical locking surface 3, 22 which is arranged concentrically with the axis of rotation 2, 21. As a result, however, of the slow creep of the set of sprags 4 in relation to the outer race 5, 25, or 125, all the sprags in the set will travel successively through the narrowest and the widest areas in the respective annular space and, consequently, as a result of the variation in the radial width of the annular space between the two locking surfaces, the sprags will execute a slow reciprocating tilting movement on each passage through the respective annular space. As a result of such combined creeping and reciprocating tilting movements, large areas of the domes or convex contact surfaces A, B of the sprags will come successively into line contact with the outer and inner locking surfaces and, despite the inevitable wear, the original curvature of contact surfaces A, B will be preserved even with extensive wear, i.e., the operational efficiency of the clutch C, $C_1$ or $C_2$ will not suffer.

FIG. 6 illustrates a further modification of my invention embodied in a one-way clutch $C_3$. The space $S_3$ of variable radial width is formed by a true cylindrical locking inner surface 33 on the outer clutch member or race 32, and by an out-of-round locking outer surface 31 on the inner clutch member or race 30. The axes of races 30, 32 coincide with the axis 21 about which the parts of the sprag type one-way clutch $C_3$ rotate. The shape of the locking surface 31 on the inner race 30 is obtained by a double periodic variation of the generating raduis. It will be readily understood that the surface 31 whose configuration is complementary to that of the locking surface 126 shown on the race 125 of FIG. 5, may be replaced by a surface complementary to the surface 26 shown in FIG. 3. Moreover, it is equally possible to form the locking surface or track 31 of the inner race 30 as a true circular cylindrical surface (see the surface 3 on the inner race 1 of FIG. 1) and to place its axis eccentrically with respect to the axis 21. The outer clutch member or race 32, whose axis coincides with the axis 21, is of circular cylindrical contour and, hence, the axis of its locking surface 33, too, coincides with the axis 21.

When the continuously varying radial width of the annular sprag-receiving space $S_3$ is obtained in the manner as above described, the individual sprags 4 will execute one complete reciprocating tilting movement during each revolution of the inner race 30 with respect to the outer race 32, or vice versa, provided that the aforementioned creeping movement of the set of sprags 4 in relation to the outer race 32 is ignored, and provided it be assumed that the set of sprags 4 continues to rotate with the outer race 32 or is at rest when the race 32 is also at rest. This is usually the case in any normal freewheel clutch. However, a construction of the one-way clutch $C_3$ as shown in FIG. 6, and the possible modifications thereof which have been indicated hereinabove, can only be considered in special cases, for example, when the clutch is to operate at very low differential or overrunning speeds, because of the frequency of the tilting movements of sprags 4 which coincides substantially with the differential speed.

It is equally possible to modify the construction of the clutch $C_3$ shown in FIG. 6 in such a way that the locking surface 33 on the outer race 32, too, is formed as an out-of-round cylindrical surface or as a circular cylindrical surface whose axis is eccentric with respect to the axis 21 about which the parts of clutch $C_3$ rotate. When both the locking surfaces are out-of-round and the axes of both races coincide with the axis of rotation, or when the locking surface of the inner race is out of round and the locking surface of the outer race is a circular cylindrical surface whose axis is eccentric with respect to the axis of rotation, there is a considerably higher frequency of the reciprocating tilting movements of the sprags because such tilting movements then take place on each revolution of the outer race in relation to the inner race, if the creep of the set of sprags in relation to the outer race is ignored. Such types of one-way clutches, too, are utilized when the overrunning speeds in the freewheel direction are very low. However, in such instances, too, the basic feature of the invention, namely, that the annular space which receives the sprags 4 between the inner and outer clutch members or races should have a periodically varying radial width, while the inner and the outer races are mounted for rotation about a common axis, is again fulfilled and, depending upon the application of the one-way clutch, either the inner or the outer race may be held against rotation, for example, when the clutch is utilized as a brake or reverse detent means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A one-way clutch comprising, in combination, an inner race having a cylindrical outer surface; an outer race surrounding said inner race and having an inner cylindrical surface and being rotatable relative to said inner face about a common axis of rotation, at least one of said cylindrical surfaces being a continuously curved out-of-round cylindrical surface having a gradually and continually varying radius of curvature so as to define with the other cylindrical surface an annular space having a radial width which gradually and continuously varies between at least one maximum and at least one minimum width angularly displaced from each other; a set of closely adjacent tiltable sprags in said annular space and having each curved opposite end faces respectively contacting said inner and outer races and adjacent sprags contacting said races substantially along contact lines angularly displaced from each other through an angle smaller than the angle of angular displacement between said maximum and minimum radial widths of said annular space; and means for permanently biasing said sprags to keep said end faces thereof in contact with said races.

2. A one-way clutch comprising, in combination, an inner race having a cylindrical outer surface; an outer race surrounding said inner race and having an inner cylindrical surface and being rotatable relative to said inner race about a common axis of rotation, at least one of said cylindrical surfaces being an out-of-round cylindrical surface having a gradually varying radius of curvature so as to define with the other cylindrical surface an annular space having a radial width which gradually and continuously varies between at least one maximum and at least one minimum width angularly displaced from each other, said out-of-round cylindrical surface having an axis of symmetry coinciding with said axis of rotation; a set of closely adjacent tiltable sprags in said annular space and having each curved opposite end faces respectively contacting said inner and outer races and adjacent sprags contacting said races substantially along contact lines angularly displaced from each other through an angle smaller than the angle of angular displacement between said maximum and minimum radial widths of said annular space; and means for permanently biasing said sprags to keep said end faces thereof in contact with said races.

3. A one-way clutch comprising, in combination, an inner race having a cylindrical outer surface; an outer race surrounding said inner race and having an inner cylindrical surface and being rotatable relative to said inner race about a common axis of rotation, at least one of said cylindrical surfaces being a continuously curved out-of-round cylindrical surface having a gradually and continually varying radius of curvature so as to define with the other cylindrical surface an annular space having a radial width which gradually and continuously varies between at least one maximum and at least one minimum width angularly displaced from each other, the other of said cylindrical surfaces being a circular cylindrical surface having an axis coinciding with said axis of rotation; a set of closely adjacent tiltable sprags in said annular space and having each curved opposite end faces respectively contacting said inner and outer races and adjacent sprags contacting said races substantially along contact lines angularly displaced from each other through an angle smaller than the angle of angular displacement between said maximum and minimum radial widths of said annular space; and means for permanently biasing said sprags to keep said end faces thereof in contact with said races.

4. A one-way clutch comprising, in combination, an inner race having a cylindrical outer surface; an outer race surrounding said inner race and having a cylindrical inner surface and being rotatable relative to said inner race about a common axis of rotation, at least one of said cylindrical surfaces being a continuously curved out-of-round cylindrical surface having a gradually and continuously varying radius of curvature so as to define with the other cylindrical surface an annular space having a radial width which gradually and continually varies between at least one maximum and at least one minimum width angularly displaced from each other; a set of closely adjacent sprags in said annular space and having each curved opposite end faces respectively contacting said inner and outer races and adjacent sprags contacting said races substantially along contact lines angularly displaced from each other through an angle smaller than the angle of angular displacement between said maximum and minimum radial widths of said annular space, said sprags being tiltable in said annular space between an extreme free wheel position and an extreme locking position, the difference between said maximum and said minimum radial widths of said annular space being at most equal to the radial increase in the height of said sprags during tilting thereof from said extreme free wheel to said extreme locking position; and means for permanently biasing said sprags to keep said end faces thereof in contact with said races.

5. A one-way clutch comprising, in combination, an inner race having a cylindrical outer surface; an outer race surrounding said inner race and having a cylindrical inner surface and being rotatable relative to said inner race about a common axis of rotation, said race surfaces defining therebetween an annular space having a radial width which gradually and continually varies between at least one maximum and at least one minimum width angularly displaced from each other, said outer race surface being a circular cylindrical surface having an axis coinciding with said axis of rotation and the other of said race surfaces being a continuously curved out-of-round cylindrical surface; a set of closely adjacent tiltable sprags in said annular space and having each curved opposite end faces respectively contacting said inner and outer races and adjacent sprags contacting said races substantially along contact lines angularly displaced from each other through an angle smaller than the angle of angular displacement between said maximum and minimum radial widths of said annular space; and means for permanently biasing said sprags to keep said end faces thereof in contact with said races.

6. A one-way clutch comprising, in combination, an inner race having an outer cylindrical surface; an outer race surrounding said inner race and having an inner cylindrical surface and being rotatable relative thereto about a common axis of rotation, said race surfaces defining therebetween an annular space having a radial width which gradually and continually varies between at least one maximum and at least one minimum width angularly displaced from each other, said inner race surface being a circular cylindrical surface having an axis coinciding with said axis of rotation and said outer race surface being a continuously curved out-of-round cylindrical surface; a set of closely adjacent tiltable sprags in said annular space between said bearings and having each curved opposite end faces respectively contacting said inner and outer races and adjacent sprags contacting said races substantially along contact lines angularly displaced from each other through an angle smaller than the angle of angular displacement between said maximum and minimum radial widths of said annular space; and means for permanently biasing said sprags to keep said end faces thereof in contact with said races.

References Cited in the file of this patent

UNITED STATES PATENTS

| | | |
|---|---|---|
| 1,292,099 | Seymour | Jan. 21, 1919 |
| 2,013,413 | Lazzarini | Sept. 3, 1935 |
| 2,090,934 | Borenstein et al. | Aug. 24, 1937 |
| 2,631,706 | Dodge | Mar. 17, 1953 |
| 2,892,522 | Moo | June 30, 1959 |
| 2,901,072 | Maurer et al. | Aug. 25, 1959 |

FOREIGN PATENTS

| | | |
|---|---|---|
| 965,155 | France | Feb. 8, 1950 |